United States Patent [19]
de La Beaujardiere

[11] Patent Number: 5,359,673
[45] Date of Patent: Oct. 25, 1994

[54] METHOD AND APPARATUS FOR CONVERTING BITMAP IMAGE DOCUMENTS TO EDITABLE CODED DATA USING A STANDARD NOTATION TO RECORD DOCUMENT RECOGNITION AMBIGUITIES

[75] Inventor: Jean-Marie R. de La Beaujardiere, Palo Alto, Calif.

[73] Assignee: Xerox Corporation, Stamford, Conn.

[21] Appl. No.: 814,347

[22] Filed: Dec. 27, 1991

[51] Int. Cl.$^5$ .................. G06K 9/72; G06K 9/03; G06F 15/38
[52] U.S. Cl. .................. 382/40; 382/57; 364/419.08
[58] Field of Search .................. 382/40, 57, 36, 39, 382/61; 364/419, 419.08, 419.14; 395/145–147

[56] References Cited

U.S. PATENT DOCUMENTS

| | | | |
|---|---|---|---|
| 4,058,795 | 11/1977 | Balm | 382/40 |
| 4,136,395 | 1/1979 | Kolpek et al. | 382/57 |
| 4,654,875 | 3/1987 | Srihari et al. | 382/40 |
| 4,674,065 | 6/1987 | Lange et al. | 382/57 |
| 4,754,489 | 6/1988 | Bokser | 382/40 |
| 4,760,604 | 7/1988 | Cooper et al. | 382/15 |
| 4,907,285 | 3/1990 | Nakano et al. | 382/48 |
| 4,914,709 | 4/1990 | Rudak | 382/57 |
| 4,949,188 | 8/1990 | Sato | 358/448 |
| 4,974,260 | 11/1990 | Rudak | 382/57 |
| 5,251,273 | 10/1993 | Betts et al. | 382/57 |
| 5,257,323 | 10/1993 | Melon et al. | 382/39 |

FOREIGN PATENT DOCUMENTS 0191407 8/1986 European Pat. Off. ...... G06K 9/62

OTHER PUBLICATIONS

Kahan et al., "On the Recognition of Printed Characters of any Font and Size", *IEEE Transactions*, vol. PAMI-9, No. 2, Mar. 1987, pp. 274–288.
Church et al., "Word Association Norms, Mutual Information, and Lexicography", *Computational Linguistics*, vol. 16, No. 1, Mar. 1990, pp. 22–23.
Koichi Kise et al., "Visiting Card Understanding System", 9th International Conference on Pattern Recognition, 14–17 Nov. 1988, vol. 1, pp. 425–429.

*Primary Examiner*—Michael T. Razavi
*Assistant Examiner*—David Fox
*Attorney, Agent, or Firm*—Oliff & Berridge

[57] ABSTRACT

Documents represented as bitmap images are transformed into coded textual data and coded graphics data by graphics and textual recognizers, which use a standard notation for recording the results of the document recognition processes, including any ambiguities, in a document description language. Recognized portions of the document, represented as editable coded data, such as for example ASCII, are placed in elements, defined in the document description language, with all contents of an element sharing some common characteristic. Elements can include, for example: character-string-elements, questionable-character-elements, questionable-word-elements, verified-word-elements, alternate-word-elements, segment-elements, and arc-elements.

20 Claims, 14 Drawing Sheets

§ Etymologies

Etymologies appear in square brackets [ ] following the "definitions". In accordance with the Dictionary's[†] policy of eliminating special symbols & dingbats...

• *Obscure Origin.* According to the noted linguist Jumblatt, the origins of numerous English words are still obscure ...

AHD

---
[†] The American Heritage Dictionary

```
<!ELEMENT s          - 0  (#PCDATA)       --char string-->
```

FIG.2

```
<!ELEMENT qc         - 0  (#PCDATA)       --questionable char-->
```

FIG.3

```
<!ELEMENT qw         - 0  (#PCDATA)       --questionable word-->
```

FIG.4

```
<!ELEMENT vw         - 0  (#PCDATA)       --verified word-->
<!ELEMENT aw         - 0  (vw, vw+)       --alternate words-->
```

FIG.5

```
<!ELEMENT text            - O ( s | aw | qc | qw )+        >

<!ATTLIST text
     id        ID           #REQUIRED
     font      IDREF        #CURRENT                       >
```

FIG.6

```
<!ELEMENT fontDef    - O  (#PCDATA)         --font family name-->

<!ATTLIST fontDef
     id       ID        #REQUIRED
     size     NUMBER    12                  --font size in points--
     weight   (ultraL | extraL | light |                --font weight--
               semiL | medium | semiB |
               bold | extraB | ultra)
                         medium
     posture  (roman | italic)   roman      --printing type style--
     base     (normal | sub | sup)  normal
     under    NUMBER    0                   --underline position if any-->
```

FIG.7

```
<!ELEMENT segment              - O  EMPTY                  >

<!ATTLIST segment
     id       ID           #REQUIRED
     x1       NUMBER       0
     dx1      NUMBER       0
     y1       NUMBER       0
     dy1      NUMBER       0
     x2       NUMBER       0
     dx2      NUMBER       0
     y2       NUMBER       0
     dy2      NUMBER       0
     thick    NUMBER       0
     dThick   NUMBER       0                               >
```

FIG.8

```
<!ELEMENT arc                    -0    EMPTY
<!ATTLIST arc
         id              ID            #REQUIRED
         x               NUMBER        0
         dx              NUMBER        0
         y               NUMBER        0
         dy              NUMBER        0
         r               NUMBER        0
         dr              NUMBER        0
         rShort          NUMBER        0
         drShort         NUMBER        0
         thick           NUMBER        0
         dThick          NUMBER        0
         theta0          NUMBER        0
         dTheta0         NUMBER        0
         theta1          NUMBER        0
         dTheta1         NUMBER        0
         theta2          NUMBER        0
         dTheta2         NUMBER        0
```

FIG.9

```
<!ELEMENT image                  -0    (#PCDATA)    --image file name-->

<!ATTLIST image
         id              ID            #REQUIRED
         x               NUMBER        0
         dx              NUMBER        0
         y               NUMBER        0
         dy              NUMBER        0
         w               NUMBER        0
         dw              NUMBER        0
         h               NUMBER        0
         dh              NUMBER        0
         resol           NUMBER        300
```

FIG.10

```
<!ELEMENT spot              -O  (#PCDATA)   --hexadecimal value-->

<!ATTLIST spot
    id              ID           #REQUIRED
    x               NUMBER       0
    dx              NUMBER       0
    y               NUMBER       0
    dy              NUMBER       0
    bx              NUMBER       0
    by              NUMBER       0                              >
```

FIG.11

```
<!ELEMENT item              -O  EMPTY     --one element identifier-->

<!ELEMENT range             -O  EMPTY     --two element identifiers-->

<!ELEMENT altern            -O  ((item|range),(item|range)+)
                                --alternative sets of element identifiers-->

<!ATTLIST item
    r               IDREF        # REQUIRED                    >

<!ATTLIST range
    from            IDREF        # REQUIRED
    to              IDREF        # REQUIRED                    >
```

FIG.12

```
<!ELEMENT tBlock          -0   (altern|item|range)+         >
<!ATTLIST tBlock
    id          ID          #REQUIRED
    x           NUMBER      0
    dx          NUMBER      0
    y           NUMBER      0
    dy          NUMBER      0
    w           NUMBER      0
    dw          NUMBER      0
    h           NUMBER      0
    dh          NUMBER      0
    x1          NUMBER      0          --abscissa of 1st char in block--
    dx1         NUMBER      0
    y1          NUMBER      0
    dy1         NUMBER      0
    inter1      NUMBER      0                          --interline--
    dir         (horiz|vertic)                      --text flow direction--
                                       horiz
    align       (left|center|right|justL|justC|justR)--alignment--
                                       left                               >
```

FIG.13

```
<!ELEMENT frame           -0   (altern|item|range)+         >
<!ATTLIST frame
    id          ID          #REQUIRED
    x           NUMBER      0                           --abscissa--
    dx          NUMBER      0                           --error on x--
    y           NUMBER      0                           --ordinate--
    dy          NUMBER      0                           --error on y--
    w           NUMBER      0                           --width--
    dw          NUMBER      0                           --error on w--
    h           NUMBER      0                           --height--
    dh          NUMBER      0                           --error on h-->
```

FIG.14

```
<!ELEMENT page          -0      (altern | item | range)+        >
<!ATTLIST page
    id                  ID      #REQUIRED
    w                   NUMBER  0                               --width--
    h                   NUMBER  0                               --height-->
```

FIG.15

```
<!ELEMENT group         -0      (altern | item | range)+        >
<!ATTLIST group
    id                  ID      #REQUIRED
```

FIG.16

```
<!DOCTYPE drStream{
<!ELEMENT drStream      -0      (page | frame | group | tBlock |
                                text | segment | arc |
                                fontDef | image | spot)+        >
<!ATTLIST drStream
    unit        (meter | point | inch)                  --measurement unit--
                                inch
    fraction    NUMBER          1200            --fraction of measurement unit-->
```

FIG.17

```
<!DOCTYPE drStream{

<!ELEMENT drStream        -0   (page | frame | group | tBlock|
                                text | segment | arc |
                                fontDef | image | spot)+              >
<!ATTLIST drStream
    unit         (meter | point | inch)           --measurement unit-->
                         inch
    fraction     NUMBER        1200        --fraction of measurement unit-->

<!ELEMENT page            -0   (altern | item | range)+
<!ATTLIST page
    id           ID            #REQUIRED
    w            NUMBER        0                               --width--
    h            NUMBER        0                               --height-->

<!ELEMENT frame           -0   (altern | item | range)+                >
<!ATTLIST frame
    id           ID            #REQUIRED
    x            NUMBER        0                               --abscissa--
    dx           NUMBER        0                               --error on x--
    y            NUMBER        0                               --ordinate--
    dy           NUMBER        0                               --error on y--
    w            NUMBER        0                               --width--
    dw           NUMBER        0                               --error on w--
    h            NUMBER        0                               --height--
    dh           NUMBER        0                               --error on h-->
<!ELEMENT group           -0   (altern | item | range)+                >
<!ATTLIST group
    id           ID            #REQUIRED                               >

<!ELEMENT tBlock          -0   (altern | item | range)+                >
<!ATTLIST tBlock
    id           ID            #REQUIRED
    x            NUMBER        0
    dx           NUMBER        0
    y            NUMBER        0
    dy           NUMBER        0
```

FIG.18A

```
w         NUMBER            0
dw        NUMBER            0
h         NUMBER            0
dh        NUMBER            0
xl        NUMBER            0            --abscissa of 1st char in block--
dxl       NUMBER            0
yl        NUMBER            0
dyl       NUMBER            0
interl    NUMBER            0                                --interline--
dir       (horiz|vertic)                           --text flow direction--
                            horiz
align     (left|center|right|justL|justC|justR)         --alignment--
```

FIG.18A cont.

```
<!ELEMENT item           -0   EMPTY            --one element identifier-->
<!ATTLIST item
     r           IDREF          #REQUIRED                                  >

<!ELEMENT range          -0   EMPTY            --two element identifiers-->
<!ATTLIST range
     from        IDREF          #REQUIRED
     to          IDREF          #REQUIRED                                  >

<!ELEMENT altern         -0   ((item|range),(item|range)+)
                                      --alternative sets of element identifiers-->

<!ELEMENT spot           -0   (#PCDATA)            --hexadecimal value-->
<!ATTLIST spot
     id          ID             #REQUIRED
     x           NUMBER         0
     dx          NUMBER         0
     y           NUMBER         0
     dy          NUMBER         0
     bx          NUMBER         0
     by          NUMBER         0                                          >
```

FIG.18B

```
<!ELEMENT image            -0    (#PCDATA)         --image file name-->
<!ATTLIST image
    id          ID              #REQUIRED
    x           NUMBER          0
    dx          NUMBER          0
    y           NUMBER          0
    dy          NUMBER          0
    w           NUMBER          0
    dw          NUMBER          0
    h           NUMBER          0
    dh          NUMBER          0
    resol       NUMBER          300                                          >

<!ELEMENT arc              -0    EMPTY                                       >
<!ATTLIST arc
    id          ID              #REQUIRED
    x           NUMBER          0
    dx          NUMBER          0
    y           NUMBER          0
    dy          NUMBER          0
    r           NUMBER          0
    dr          NUMBER          0
    rShort      NUMBER          0
    drShort     NUMBER          0
    thick       NUMBER          0
    dThick      NUMBER          0
    theta0      NUMBER          0
    dTheta0     NUMBER          0
    theta1      NUMBER          0
    dTheta1     NUMBER          0
    theta2      NUMBER          0
    dTheta2     NUMBER          0                                            >
```

FIG.18B cont.

```
<!ELEMENT segment          -0    EMPTY                              >
<!ATTLIST segment
    id          ID        #REQUIRED
    xl          NUMBER    0
    dxl         NUMBER    0
    yl          NUMBER    0
    dyl         NUMBER    0
    x2          NUMBER    0
    dx2         NUMBER    0
    y2          NUMBER    0
    dy2         NUMBER    0
    thick       NUMBER    0
    dThick      NUMBER    0                                         >

<!ELEMENT fontDef          -0    (#PCDATA)       --font family name-->
<!ATTLIST fontDef
    id          ID        #REQUIRED
    size        NUMBER    12              --font size in points--
    weight                (ultraL | extraL | light|       --font weight--
                           semiL | medium | semiB
                           bold | extraB | ultra
                                      medium
    posture               (roman | italic)  roman   --printing type style--
    base                  (normal | sub | sup)  normal
    under       NUMBER    0               --underline position if any-->

<!ELEMENT text             -0    (s | aw | qc | qw)+                >
<!ATTLIST text
    id          ID        #REQUIRED
    font        IDREF     #CURRENT                                  >

<!ELEMENT s                -0    (#PCDATA)       --char string-->

<!ELEMENT aw               -0    (vw,vw+)        --alternate words-->

<!ELEMENT vw               -0    (#PCDATA)       --verified word-->

<!ELEMENT qc               -0    (#PCDATA)       --questionable char-->

<!ELEMENT qw               -0    (#PCDATA)       --questionable word-->
>
```

FIG.18C

METHOD AND APPARATUS FOR CONVERTING BITMAP IMAGE DOCUMENTS TO EDITABLE CODED DATA USING A STANDARD NOTATION TO RECORD DOCUMENT RECOGNITION AMBIGUITIES

BACKGROUND OF THE INVENTION

1. Field of the Invention

The present invention relates to document recognition, and in particular to methods and apparatus for recognizing textual and graphics structures in documents originally represented as bitmap images, and for recording the results of the recognition process.

2. Description of Related Art

Document recognition is the automatic transformation of paper documents into editable electronic documents. It entails the gradual transformation of bitmaps into structured components, through successive and recursive interventions of various processes. These processes include: page segmentation, character recognition, graphics recognition, logical structure reconstruction, spelling correction, semantic analysis, etc. All these processes are prone to misinterpretation. Not all processes keep a record of the misinterpretations they are aware of, and the ones that do keep a record have no standard way of doing so. As a consequence, downstream processes are generally not prepared to handle the record of ambiguities handed to them by upstream processes, and simply discard them. Valuable information is lost instead of being exploited for automatic improvement of the document recognition function. If, on the other hand, the ambiguity record is passed in its raw state to the user, the chore of making manual corrections can quickly outweigh the advantages of automatic recognition over a manual reconstruction of the entire document.

U.S. Pat. Nos. 4,914,709 and 4,974,260 to Rudak disclose an apparatus and method for identifying and correcting characters which cannot be machine read. A bitmap video image of the unrecognized character(s) is inserted in an ASCII data line of neighboring characters, thereby allowing an operator to view the character(s) in question in context to aid in proper identification of the character(s). Subsequently, with the aid of the video image, the operator enters the correct character(s) via a keyboard or other means. This apparatus and method require operator interaction to clarify any ambiguities resulting from an automatic document recognition process. The results of these ambiguities are not recorded in a notation that can be used by other downstream automatic devices.

U.S. Pat. No. 4,907,285 to Nakano et al discloses an image recognition system which uses a grammar for describing a document image, and parses statements expressed by the grammar to recognize the structure of an unknown input image. The grammar describes the image as substructures and the relative relation between them. In the parsing process, after the substructures and their relative relation are identified, a search is made as to whether the substructures and their relative relation exist in the unknown input image, and if they do, the inside of the substructures are further resolved to continue the analysis. If the substructures do not exist, other possibilities are searched and the structure of the unknown input image is thus represented from the result of the search. For example, the location of a rectangular region of the document which contains a statement defined by the document grammar (for example "TITLE" and "AUTHOR") is initially represented by variables. See FIG. 10 of U.S. Pat. No. 4,907,285. After locating this region in the document, the appropriate numeric values are substituted for the variables.

U.S. Pat. No. 4,949,188 to Sato discloses an image processing apparatus for synthesizing a character or graphic pattern represented by a page description language and an original image. The image processing apparatus generates a page description language including code data which represents characters, graphics patterns, and the like, and command data which causes a printer to print the original image. Ambiguities from previous document recognition processes are not recorded in the page description language. See, for example, the table in column 4, lines 5–10. Accordingly, any downstream device receiving the page description language cannot determine whether any ambiguities occurred in the previously performed document recognition processes.

U.S. Pat. No. 4,654,875 to Srihari et al discloses a method of automatic language recognition for optical character readers. Language in the form of input strings or structures is analyzed on the basis of: channel characteristics in the form of probabilities that a letter in the input is a corruption of another letter; the probabilities of the letter occurring serially with other recognized letters that precede the letter being analyzed or particular strings of letters occurring serially; and lexical information in the form of acceptable words represented as a graph structure. Ambiguities from upstream recognition processes are not recorded.

"Word Association Norms, Mutual Information, and Lexicography", by Kenneth W. Church and Patrick Hanks, Computational Linguistics, Vol. 16, No. 1 (March 1990) discloses a measure, referred to as an "association ratio" based on the information theoretic notion of mutual information, for estimating word association norms from computer readable corpora. This association ratio can be used by a semantics analyzer to determine a most likely word from a choice of two or more words that have been identified as possible words.

"On the Recognition of Printed Characters of Any Font and Size", by Simon Kahan, Theo Pavlidis and Henry S. Baird, IEEE Transactions on Pattern Analysis and Machine Intelligence, Vol. PAM1-9, No. 2 (March 1987), discloses a system that recognizes printed text of various fonts and sizes for the Roman alphabet. Thinning and shape extraction are performed directly on a graph of the run-length encoding of the binary image. The resulting strokes and other shapes are mapped, using a shape-clustering approach, into binary features which are then fed into a statistical Bayesian classifier. This system identifies multiple possible characters or words, and scores them. However, the uncertainty in the recognition processes is not recorded using the standard notation of the present invention.

In summary, a number of systems exist which can recognize graphics structures, text (characters, words, semantics, fonts) and logical structures (pages, paragraphs, footnotes), and which can determine the uncertainty with which the recognized feature was recognized. Accordingly, the above-identified patents and papers are incorporated herein by reference. However, none of these systems record the results of the recognition process (including uncertainties) in a manner which can be used by other devices. This results in much information (particularly regarding uncertainty) being lost, especially when different recognition systems (e.g., character recognizers, word recognizers, semantics analyzers) are used at different times (as opposed to being integrated into one system).

OBJECTS AND SUMMARY OF THE INVENTION

It is an object of the present invention to provide methods and apparatus for recording ambiguities in document recognition processes in a standard format which can be used by a variety of document recognizers.

It is another object of the present invention to provide methods and apparatus for converting bitmap images into editable coded data, wherein information regarding ambiguities in the transformation processes performed by upstream recognizers can be recorded and thus used by downstream, higher level recognizers which attempt to resolve these ambiguities.

To achieve the foregoing and other objects, and to overcome the shortcomings discussed above, methods and apparatus are provided for converting documents represented as bitmap image data into editable coded data, wherein a standard notation in a document description language is utilized for recording document recognition ambiguities by each document recognizer. When the results of document recognition processes are recorded using this standard notation, any ambiguities are identified in a uniform manner so that downstream, higher level document recognition processes can attempt to resolve these ambiguities by using all information about the ambiguities obtained by upstream document recognition processes.

In particular, when using the standard notation of the present invention, each document recognizer can record the results of its recognition process in one or more elements, selectively identified using the document description language. Each element includes a type-identifier indicating a type of coded data (information) regarding the recognized (transformed) bitmap image contained therein. Each element also includes editable coded data therein of the type identified by the type-identifier, and can also include uncertainty information identifying any coded data which was not transformed with a predetermined level of confidence. This uncertainty information is determined by the document recognizer, and is recorded in a format that is readable by higher level, downstream document recognizers. This uncertainty information can include the level of confidence with which the uncertain coded data was recognized by the document recognizer, in order to further assist the higher level document recognizers in resolving ambiguities. The uncertainty information can also include alternative coded data for each uncertain recognition.

When the document recognizer is a character recognizer, any characters which are not recognized with a predetermined level of confidence are identified and recorded by placing them in questionable-character-elements. The degree of certainty as well as alternative possible characters and their degree of certainty can also be recorded for each questionable character. Characters which were recognized with at least the predetermined level of confidence are placed in character-string-elements.

When the document recognizer includes a word recognizer (such as, for example, a spelling checker), the word recognizer attempts to resolve any existing questionable characters by determining whether any words exist in a lexicon based upon each questionable character and the certain characters in the word containing each questionable character. If a word is identified in the lexicon for the word containing a questionable character, that word is identified as a verified word, and is recorded in a verified-word-element. If more than one verified words are found, they are placed in individual verified-word-elements which are collectively grouped together in an alternate-word-element. If no verified words are found for the word containing a questionable character, the questionable-character-element remains.

When the document recognizer includes a semantics analyzer, any identified alternate verified words are resolved by analyzing the words surrounding the alternate verified words. If one of the alternate verified words can be confirmed with a predetermined level of confidence based on the semantics analysis, it is returned and merged with the surrounding character-string-elements. If the semantics analyzer cannot determine which of the alternate verified words is correct, it returns the alternate-word-element (and included verified-word-elements) as such, and can include data indicative of the probability that each verified word therein is the correct word.

When the document recognizer includes a graphics structure image recognizer, it outputs graphics-elements containing coded data representative of graphics structures recognized in the graphics image. These structures can include: lines defined between endpoints; circles; arcs; etc. Additionally, line thickness information can also be returned and recorded. Ambiguities in the recognition process such as x and y direction offsets and line thickness variations can also be recorded. This data can be used by downstream higher level graphics recognition processes to resolve any ambiguities, or to recognize more complex graphics structures. For example, four lines recognized by a low level graphics recognizer could be determined to be a box by a higher level graphics recognizer if, for example, the endpoints can be determined with a high degree of certainty to be coincident.

Additional image recognition elements are produced for recording information relating to larger portions (or subimages) of the document image. For example, data related to font text blocks, frames, pages, documents, and large and small pieces of unresolved bitmap images can also be recorded.

BRIEF DESCRIPTION OF THE DRAWINGS

The invention will be described in detail with reference to the following drawings in which like reference numerals refer to like elements, and wherein:

FIG. 2 illustrates a character-string-element for collecting streams of characters recognized with or above a predetermined confidence level;

FIG. 3 illustrates a questionable-character-element for collecting questionable characters recognized with a low confidence level;

FIG. 4 illustrates a questionable-word-element for collecting a questionable word which contains characters recognized with high confidence, but which was not found in a lexicon;

FIG. 5 illustrates verified-word-elements for collecting verified words found in a lexicon by resolving a word containing one or more questionable characters, and an alternate-word-element for collecting alternate words when two or more verified words are found for one word containing questionable characters;

FIG. 6 illustrates a text-element for collecting text elements having the same font;

FIG. 7 illustrates a fontDef-element for collecting data relating to a font type;

FIG. 8 illustrates one type of graphics-element which is a segment-element for collecting data relating to a line segment;

FIG. 9 illustrates another type of graphics-element which is an arc-element for collecting data relating to an arc;

FIG. 10 illustrates another type of graphics-element which is an image-element for collecting data relating to a large unresolved bitmap image;

FIG. 11 illustrates another type of graphics-element which is a spot-element for collecting information relating to a small unresolved bitmap image referred to as a spot, and for storing this information as a hexidecimal value;

FIG. 12 illustrates examples of elements referring to other elements;

FIG. 13 illustrates a tBlock-element for collecting information relating to blocks of text;

FIG. 14 illustrates a frame-element for collecting information relating to frames which can include text blocks, images, spots, arcs and segments, as well as other frames;

FIG. 15 illustrates a page-element for collecting data relating to a page;

FIG. 16 illustrates a group-element for collecting information relating to a group of elements which extend across page boundaries;

FIG. 17 illustrates a drStream-element for collecting data relating to an entire document;

FIGS. 18A–C are a collection of all syntax necessary for describing a document;

DETAILED DESCRIPTION OF THE PREFERRED EMBODIMENTS

Figure 1:
FIG. 1 is a sample page image used to illustrate the present invention.

The present invention utilizes a straight forward procedure for recording ambiguities through the successive stages of the document recognition process. These ambiguities are in the context of:

characters processed by character recognizers;
words processed by character recognizers, spelling checkers, and semantics analyzers;
text flow processed by logical structure reconstructers; and
geometry of line segments and arcs processed by graphics recognizers.

Each of these processes produce and/or consume a byte-oriented data stream (hereinafter referred to as a document recognition stream or DRstream), and bit-map streams (hereinafter referred to as image files), referenced by the DRstream. The DRstream carries information about one or several pages of a digitized document. The information describes text with font, certain graphics primitives, and half tone images, as well as their relationships, and the ambiguities about them.

The present invention does not provide any new document recognition processes (or document recognizers) in the sense that it can be used with existing recognizers which recognize, for example, characters or graphics structures, or determine words (by comparing sequences of characters against a lexicon of known words), or determine which word from a choice of possible words is correct. However, the present invention improves the efficiency and compatibility with which these different types of recognizers function by providing a standard notation for recording the results obtained by the recognizers in a document description language.

FIGS. 2–18C illustrate this document recognition notation in ISO 8879 Standard Generalized Mark-up Language (SGML), according to the Document Type Definition discussed below. According to the present invention, each recognizer records coded data, corresponding to the results of the recognition process which it performs, as coded information, referred to in SGML as elements. Each element contains coded data which has been recognized as being similar in some way (for example: text, graphics, same page, all certain characters, etc.). Each element includes: a) a type-identifier which indicates the type of coded data contained in that element; b) an optional identification number, unique amongst all similar type elements of a document, which distinguishes that element from other similar type elements so that an element can be referenced by other elements (most elements will have an identification number); c) coded data obtained by the document recognition process (this could be strings of characters or parameters defining graphics structures); and d) optional contents (referred to as attributes) for providing additional information (for example, uncertainty information) about the coded data included in that element. Although the attributes of an element can be used to record uncertainty information about coded data in an element (information such as, for example, levels of confidence with which the coded data was recognized, or possible offsets for parameters (e.g. endpoints defining a line segment) of a graphics structure), the type-identification in some cases also serves to convey uncertainty information by indicating that the contents of that element was determined with a level of confidence below a predetermined level of confidence. In the illustrated examples, the coded data is recorded as human readable ASCII, however other codes could also be used.

One familiar with SGML will understand the generic contents of the elements to be described below. Thus, only a brief discussion of a generic element will be provided with reference to FIGS. 18A–C. Then, each type of element will be specifically described with reference to FIGS. 2–17. FIGS. 18A–C illustrate a complete syntax of elements which can be used to describe a document according to the present invention. This list of elements would be located at the start of each DRstream, and would be used by conventional parsers, programmed to parse streams written in SGML, to parse the DRstream contained therebelow. That is, after the syntax list of elements, a continuous stream of elements describing a specific document would be provided. As used herein, the terminology continuous stream of elements' refers to a group of elements which are identified as belonging together. Thus, in a markup language such as SGML, where white-space is permitted (and, in fact, encouraged for readability), tabs, breakage into separate lines constitute white-space that the parser will ignore. In this sense, white-space is part of the continuous stream of elements. Other systems may have a limit on the size of character streams. In these systems, long DRstreams would be split across several files which would be identified as belonging together. Such a DRstream, where several files are identified as belonging together, is also intended to be covered by the terminology "continuous stream of elements". (Some of the elements in FIGS. 18A–C include attributes (to be described below) which also would be listed at the start of the DRstream.) Of course, all of the elements listed in FIGS. 18A–C are not required to record the results of a document recognition process; however, when more elements are provided, more information can be recorded. Referring to FIG. 2, in SGML: the terminology "!ELEMENT s" means "define an element whose type is 's'"; the terminology "-O" means "the element begins whenever its type identifier appears bracketed <>, the element ends with </> (element-end marker), or when another element begins at the same or a higher level in the nesting structure"; and "(#PCDATA)" means "the contents of this element is a character string". Thus, FIG. 2 defines an element containing a character string (such as "horse") which would be recorded as follows:

<s>horse</s>; or

<s>horse</>; or

<s>horse

Other possible contents of a element can be other elements (see, for example, the aw element of FIG. 5 which includes two or more vw elements as its contents), or only attributes (represented by EMPTY and a attribute list—see FIG. 8). The terminology "+" indicates that the immediately preceding item can be repeated. These definitions will become more clear as each element is defined in more detail below.

FIG. 1 is a sample page image which will be used to illustrate the types of bitmap images which can be transformed and recorded, and their form of recordation, using the present invention. The sample image includes various interesting features, such as: characters hard to recognize because of their poor shape or poor quality; structured graphics in the form of two line segments; bitmap graphics in the form of some undefined drawing; logical structure in the form of footnote and its callout character.

FIG. 2 illustrates a character-string-element (s) into which a character recognizer collects characters that meet the following conditions:
 all characters have been recognized with a high confidence level (having at least a predetermined level of confidence);
 all characters have the same font, baseline position and underlining status; and
 there is no significant white gap between each character (for instance, characters that are horizontally aligned but belong to two columns of text, separated by a certain amount of white space, are not put together in the same element). The illustrated type-identifier is "s". Character-string-elements do not have id numbers, but instead can be placed in larger elements.

With reference to the FIG. 1 image, a portion of that image having a series of characters recognized with at least a predetermined level of confidence by a character recognizor would be recorded using the present invention implemented in SGML as follows:

<s>Etymologies appear in square
 brackets[]following </>

<s> the "definitions". In accordance with the </>

FIG. 3 shows a questionable-character-element (qc) where a character recognizer places characters that have a low certainty of being correctly recognized. Existing character recognizers currently determine a level of confidence for each character. If a character is not recognized with at least a predetermined level of confidence, these character recognizers somehow tag the character. However, bringing an uncertain character to the attention of the user is another matter. Some vendors have an interactive package where recognizing and asking a user for guidance are intertwined; it is not known whether these systems tag uncertain characters as such, because it is an internal matter, and the uncertainty is lifted right away by user intervention. Other vendors merely tag the uncertain characters, say with a pair of question marks, creating the problem that the next process down the line cannot distinguish these question marks from genuine ones. However, questionable characters are not recorded in a manner that can be used by other machines. (That is, question marks and highlighting may have some other meaning.) Thus, when this data is passed to a higher level device such as a spelling checker, the spelling checker will not be able to utilize the information that the character was not recognized with a high degree of certainty.

In the present invention, a higher level device receives the information that a character was not recognized with a high degree of certainty since every character located in a questionable-character-element contains that characteristic. Thus, by using a notation in a document description language to record ambiguities, other recognizers can utilize uncertainty information. Preferably, each qc element carries one questionable character. The qc element could also contain a list of alternate characters if the character recognizer identifies more than one possible character below the predetermined confidence level for a particular portion of a bitmap image. Additionally, the degree of certainty for the one or plurality of questionable characters can also be provided in each qc element. Ideally, questionable-character-elements are subsequently eliminated by a spelling checker.

For example, the system described in the above incorporated paper by Simon Kahan et al could be used to generate alternate characters (or words), each having some type of measure indicative of the level of confidence associated with that character (or word). However, unlike the system disclosed by Kahan et al, this information relating to characters and/or words would be recorded in appropriate, distinct elements using a document description language according to the present invention. This would enable other, higher level document recognizing processes (which may be separate from and used at a time separate from the Kahan et al system) to access this information in a uniform way.

The present invention also permits existing recognizers to operate in a more efficient manner. For example, by distinguishing between certain and uncertain characters (or words), more complicated and time consuming recognition procedures can be limited to the uncertain characters (or words).

FIG. 4 illustrates a questionable-word-element (qw) into which a word recognizer (e.g. spelling checker) places words that contain letters recognized with a high level of confidence, but which are not found in the lexicon of the word recognizer. There is one questionable word per qw element. These questionable words can be resolved by other word recognizers which include different lexicons, or by some other means (such as a semantics analyzer), to be described below.

With reference to FIG. 1, suppose all the characters in the word "Jumblatt" were confidently recognized, but the spell checker of the word recognizer did not find the word "Jumblatt" in its lexicon. It would be recorded in a qw element as follows:

<qw>Jumblatt</>.

FIG. 5 illustrates a verified-word-element (vw) and an alternate-word-element (aw) into which a word recognizer places words which are found in its attempt to eliminate questionable-character-elements. The word recognizer looks for words in a lexicon for each occurrence of a questionable character based upon the word associated with a questionable-character-element. If a word is found in its lexicon, the word recognizer places that word in a vw element. When the word recognizer tries to eliminate questionable characters, it may find several words, verified in its lexicon. If the word recognizer cannot decide between the verified words, it places each of them in a vw element and places the set of vw elements in an aw element for the benefit of a downstream process such as the semantics analyzer.

The semantics analyzer would then attempt to determine which of the verified words is correct by analyzing the words surrounding each occurrence of alternate words.

The word recognizer could use various conventional processes for selecting words to be compared with a lexicon. For example, every letter of the alphabet could be substituted for the questionable-character-element in the word containing that questionable-character-element, and these results searched in the lexicon. If alternate questionable characters are provided in a questionable-character-element, the substitution could be limited to only the alternate questionable characters. If no verified words are found, the questionable-character-element would remain, and optionally, the uncertainty information contained therein could be updated by the word recognizer.

Consider, for example, the two strings and questionable character from FIG. 1 illustrated below found by a character recognizer:

<s>the origins of numerous English w</s>

<qc>a</q>

<s>rds are still obscure</s> the word recognizer, trying to reduce the questionable "a", find "wards" and "words" as candidates and replaces the above notation by:

<s>The origins of numerous English</s>

<aw><vw>wards</vw><vw>words</vw></aw>

<s>are still obscure</s>

The stream of elements could be supplied to a semantics analyzer which would attempt to determine which word was correct. If the semantics analyzer can determine which word is correct, it merges that word into the surrounding s-elements. For example, assume the following data is provided to the semantics analyzer:

<s>, the origins of numerous English </s>
<aw>
   <vw>wards</>
   <vw>words</>
<s> are still obscure.</> and it decides from the context that "words", not "wards", is the correct choice. It can replace the above notation by any of the choices below (it does not really matter which choice is selected, however the first choice is the most logical and the second choice is the most expedient):

<s>, the origins of numerous English words are still obscure.</>
<s>, the origins of numerous English <s>words<s> are still obscure.</>
<s>, the origins of numerous English words <s> are still obscure.</>
<s>, the origins of numerous English <s> words are still obscure.</>

It should be noted that the intermediate </>s have been omitted since they are optional.

FIG. 6 illustrates a text-element which is used to collect character data (s, aw, qc and qw elements) of the same font. A text element has an id attribute, allowing it to be referenced by higher elements, and an optional reference to a font identifier (defined below). If the font reference is not supplied, the most recently supplied one is used. The text-elements are produced by character recognizers that can discern different fonts. An example of data recorded in a text-element is as follows:

<text id=123 font=2>list of s, aw, qc and qw elements</>

FIG. 7 illustrates a fontDef-element. Type faces analyzed by the character recognition process are recorded in fontDef elements with as much information as possible. The contents of a fontDef element is the font family name, if the character recognizer is able to derive it with confidence. In the likelihood that font name cannot be derived, the contents is left empty; it could be filled later, either by a downstream process or interactively by a user.

The id-attribute enables text elements to reference font descriptions. The size-attribute is measured in points. The base-attribute indicates whether the base line is offset by superscripting or subscripting. If there is underlining, the under-attribute indicates the position of the underline below the base line of the font. An example of data recorded in a fontDef-element where the font family name is Frutiger is as follows:

<fontDef id=2 size=10 under=1>Frutiger</>

Note that the attributes are recorded in the first set of brackets < >.

FIG. 8 illustrates a segment-element which is one type of graphics-element. Segment-elements are used by the graphics recognizer to note line segments it recognizes from the bitmap image. The id-attribute enables higher elements to reference the segment-element. The coordinates of the ending points (x1, y1 and x2, y2), relative to the top left corner of the page, define the segment mathematically. The uncertainty about the exact ending point coordinates is recorded in the dx1, dy1 and dx2, dy2-attributes. Thus, dx1, dy1, dx2 and dy2 record possible offsets of the parameters (x1, y1, x2, y2) used to describe the line segment graphics structure. The segment thickness and its uncertainty are noted by the thick and dThick-attributes. An example of data recorded in a segment-element is provided below:

<segment id=14x1=2100dx1=5y1=1440x2=2100
    dx2=5y2=2160thick=17></>

As with the fontDef-element, the attributes are provided within the first set of brackets. Since the segment-element does not contain any character strings (its content is EMPTY), the first set of brackets is followed by an element-end marker </> or, since element-end markers are not required by a new element.

FIG. 9 illustrates an arc-element, which is another type of graphics-element. Arc-elements are used to note circles, circular arcs, ellipses and elliptical arcs recognized from the bitmap image by the graphics recognizer. The id-attributes enable higher level elements to reference the arc. The other attributes are:

- x, y, dx, dy: coordinates and uncertainty at the center of the circle, elliptical arc, measured from the top left corner of the page;
- r, dr: length and uncertainty of the radius of arc of a circle, or long axis of the arc of an ellipse;
- rShort, drshort: length and its imprecision of the short radius of the arc of an ellipse;
- theta 1, dTheta1: angle between the vertical axis and the line passing through the center and one of the end points of the arc. This attribute is present for arcs only. The angle can be measured in milliradians;
- theta2, dTheta2: same as theta1, dTheta1 for the other endpoint;
- theta0, dTheta0: angle between the vertical axis and the long axis of an ellipse. This attribute is present for ellipses and elliptical arcs only;
- thick, dThick: thickness and uncertainty of the arc, circle or ellipse.

An example of data recorded in an arc-element is as follows:

>arc id=5462x=2300 dx=8y=1440
    dy=8r=2100dr=15></>

FIG. 10 illustrates an image-element which is a third type of graphics-element. The image element is used to denote a rectangular area of the page that has not been resolved as text or structured graphics, and is therefore left in bitmap form in a separate file. The image element contains the name of the file.

The image element attributes encode the position and uncertainty relative to the top left corner of the page (x, dx, y, dy) and the dimensions (w, dw, h, dh) of the image. The resol-attribute is expressed in bits per unit of measurement (the units of measurement is supplied by the dsStream element, defined later).

At the onset of the document recognition operation, the DRstream usually contains only image elements, one per digitized page of the paper document. Gradually, as character strings, line segments and arcs are extracted (using conventional techniques), the bitmaps are replaced by smaller and perhaps more numerous ones. At the completion of the operation, the only bitmaps left are the genuine half tone images and the portions of the document that the character recognizer and graphics recognizer could not decipher.

A bitmap image stored in a file named "Squiggle" would be recorded as follows:

<image id=567x=1840 y=1680 w=260
    h=480>Squiggle</>

FIG. 11 illustrates a spot-element, which is a fourth type of graphics-element. Spot-elements contain small images and denote a very small rectangular area left in bitmap format: unrecognized small smudges, dingbats, unknown symbols, etc. The bitmap is small enough that its bitmap can be encoded conveniently in hexadecimal form as the contents of the spot-element, rather than carried in a separate file.

The x, dx, y and dy-attributes supply the position of the spot with respect to the top-left corner of the page. The bx-attribute gives the number of bits in the horizontal direction. It is constrained to be a multiple of eight. The by-attribute gives the number of 1-bit high rows. When a spot element needs to be imaged, the hexadecimal value is consumed 8*bx bits (2*bx hexadecimal characters) at a time for each row. The hexadecimal value contains trailing 0 bits where appropriate.

Suppose that the bullet • in the FIG. 1 sample page has not been recognized. It would be noted as a small image as follows:

spot id=11 x=590 y=850 bx=25
    by=25>03FFB000 ... </>

FIG. 12 illustrates references to other elements. The text, segment, arc, image and spot-elements may be grouped together by higher-level elements (text blocks, frames and pages, discussed below), via a reference to their identifier. A reference to a single element is made by an item-element, the single attribute of which has the value of the identifier of the referenced element.

A reference to a consecutive succession of elements is made by a range element: "from" and "to" attributes refer to the identifiers of the first and last referenced elements. "First" and "last" are relative to the chronological order in which the elements are found in the DRstream. A range-element is a short-hand notation for an unbroken succession of item-elements.

Ambiguities about grouping are denoted by altern-elements. Alternative groupings are used by processes to encode a number of reasonable element groupings. For instance, a page of text has been recognized as having four text blocks, two on the left side and two on the right; the logical structure processor (or logical reconstructer), unable to determine if the text reads as two columns or as two rows, groups them in the order top left, bottom left, top right, bottom right; or the order top left, top right, bottom left, bottom right; a downstream process like a syntactic analyzer might be able to resolve the ambiguity.

FIG. 13 illustrates a tBlock element. tBlock-elements encode rectangular areas forming an invisible boundary around a text line or a set of equally spaced text lines. The location of a tBlock, relative to the top left corner of the page, and their imprecision are given by the x, y, dx and dy-attributes. The dimensions and uncertainties are recorded by w, h, dw, and dh. The internal-attribute measures the interval between the equally-spaced lines within the block; its value is zero when the text block contains one line only. The x1, dx1, y1, dy1-attributes give the location of the first character in the text block, relative to the top left corner of the block.

FIG. 14 illustrates a frame-element. A frame-element encodes a rectangular area, smaller than or equal to the page area. It is used to aggregate text blocks, images, spots, arcs and segment, as well as other frames. Frames may overlap on the page.

FIG. 15 illustrates a page-element. A page-element aggregates all the pieces of information about a digitized page of a document. If there is no page-element in a DRstream, it is assumed that all the DRstream data belongs to a single page.

FIG. 16 illustrates a group-element. A group element enables a collection of the elements across page boundaries. It may be used by the logical structure reconstructer and the semantic analyzer to indicate the flow of text across pages.

FIG. 17 illustrates a drStream element. At the top of the document type definition, is the drStream element. Its unit-attribute gives the name of the measurement unit used throughout the drStream. The fraction-attribute indicates what fraction of the measurement unit the coordinates, dimensions, and their imprecisions actually represent. For example, if the measures are in microns, the drStream element attributes are:

drStream unit=meter fraction=1000000>

FIGS. 18A–C illustrates all of the elements used in the disclosed page description language.

Figure 19:
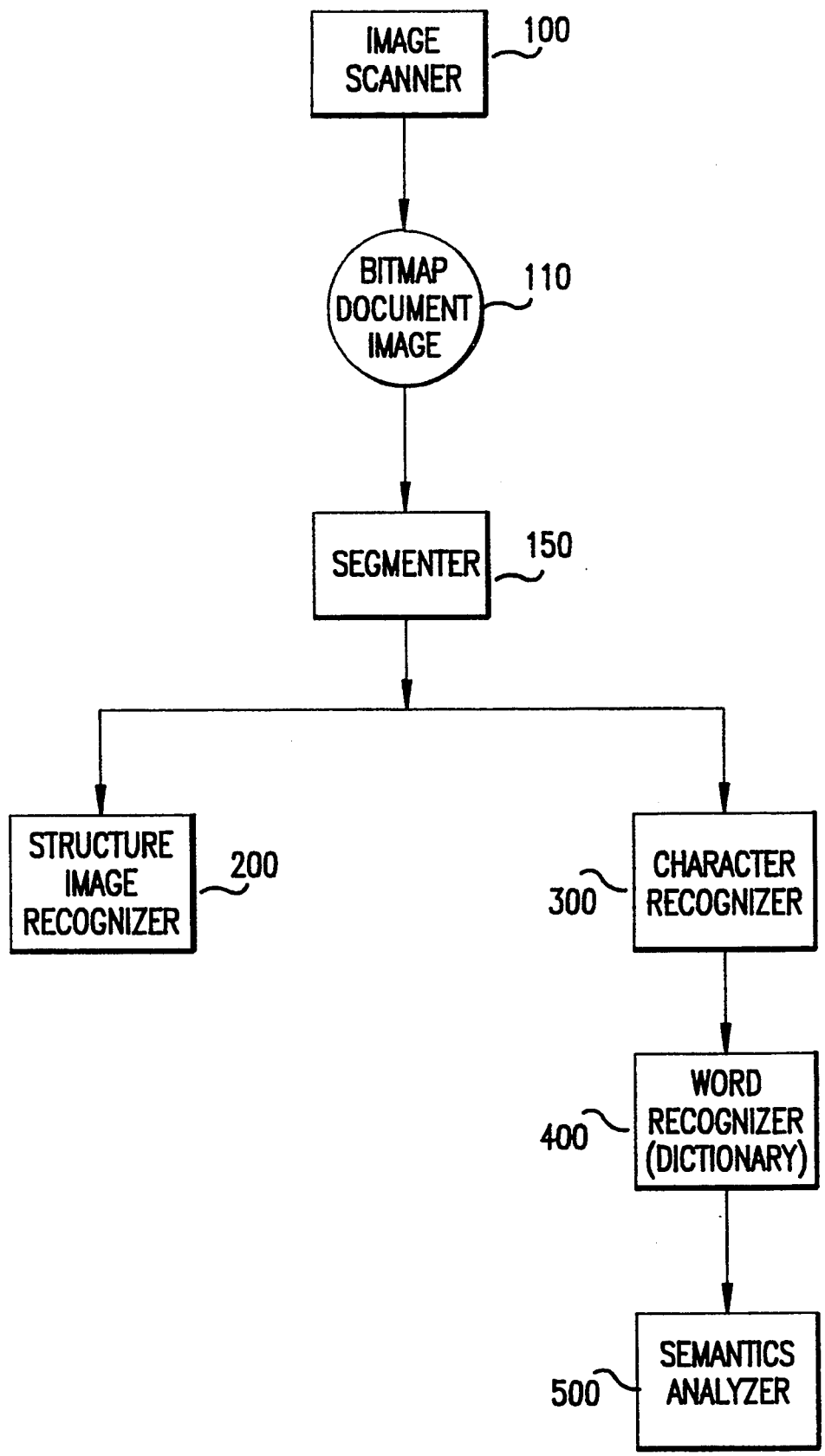
FIG. 19 is a block diagram of a system for inputting and converting a bitmap image into coded data streams using the present invention.
Figure 20:
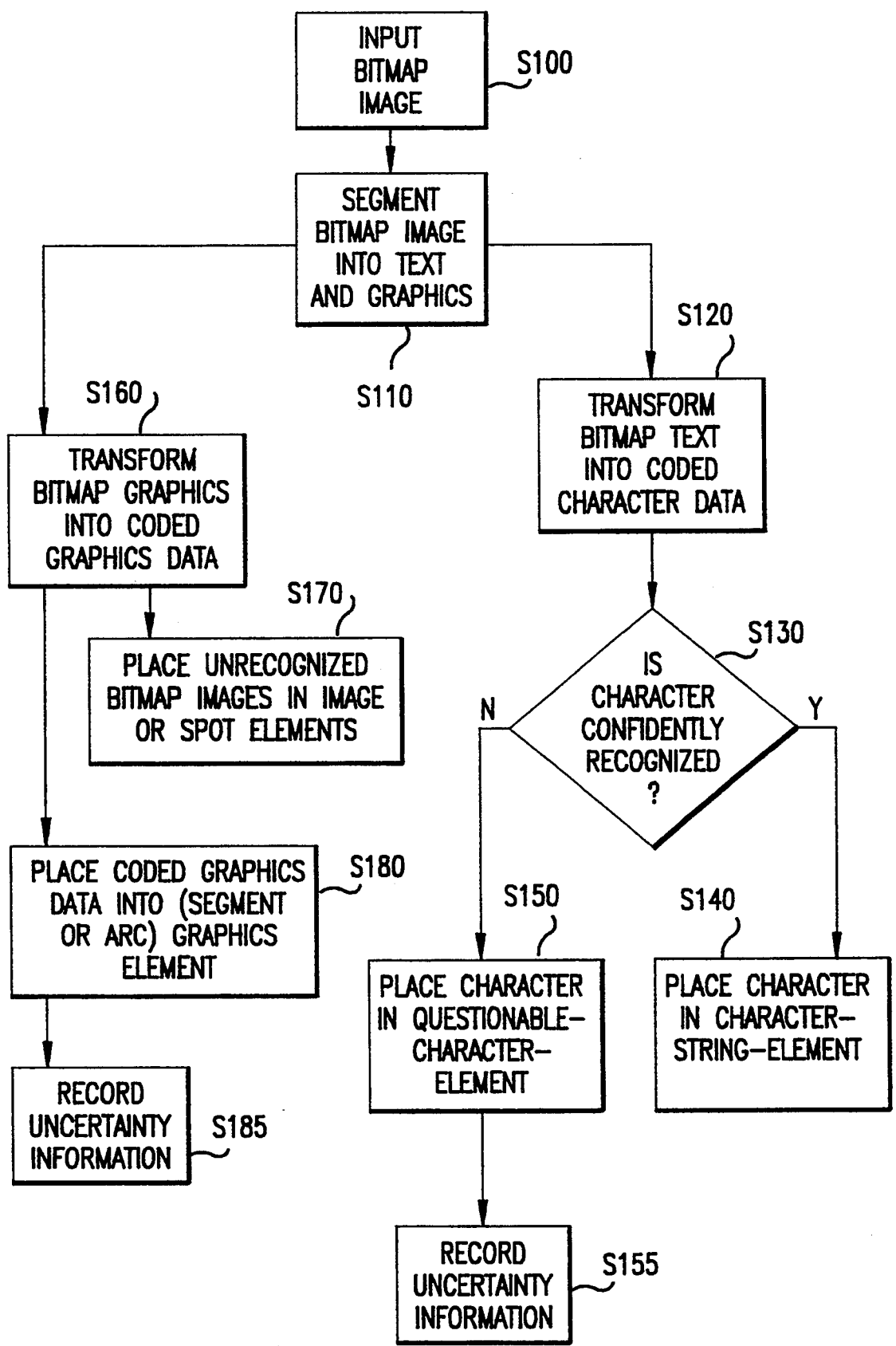
FIG. 20 is a flowchart illustrating a procedure performed by the system of FIG. 19 when using the present invention.
Figure 21:
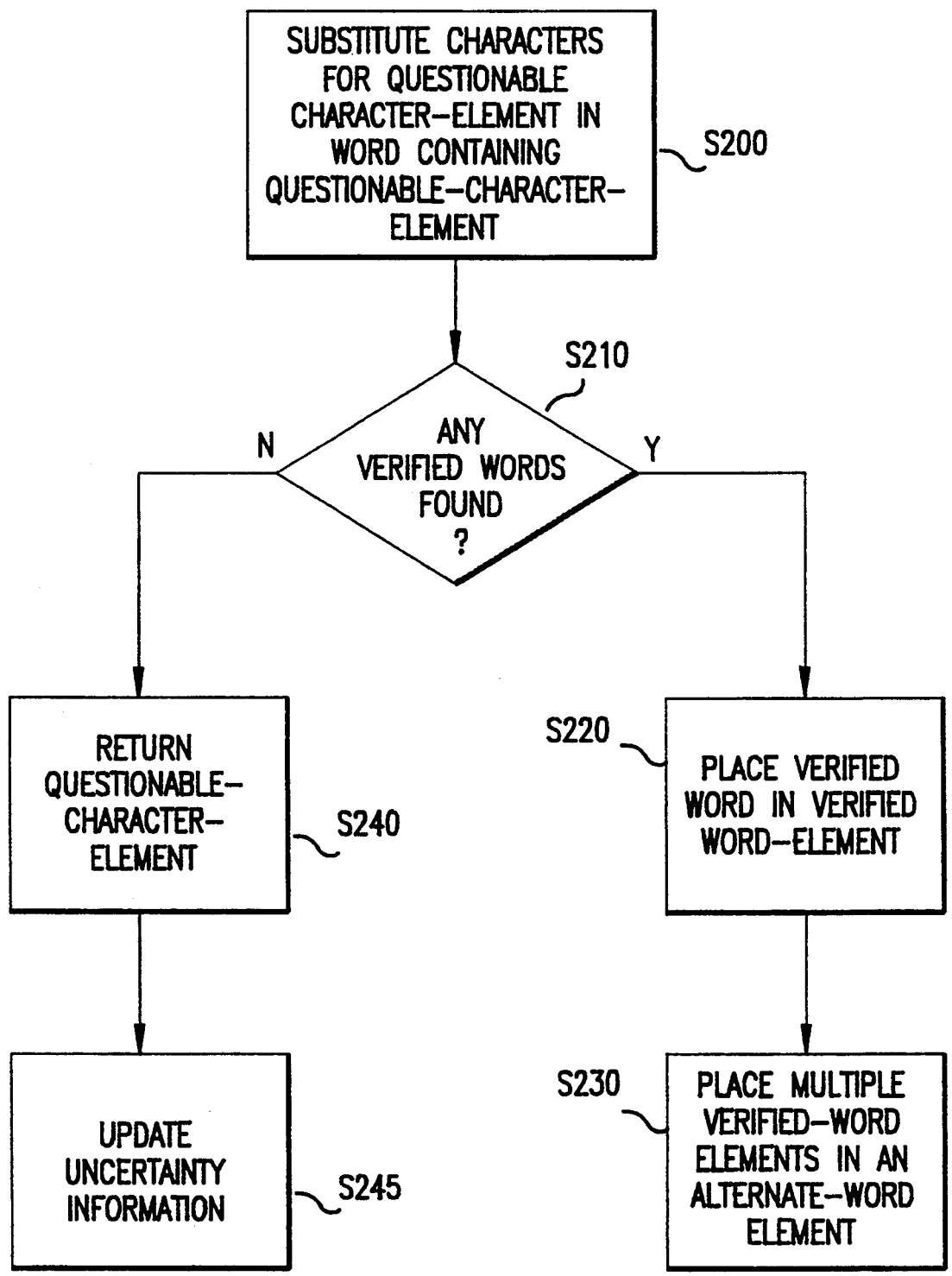
FIG. 21 is a flowchart illustrating a procedure performed by the word recognizer of FIG. 19 when using the present invention.

FIG. 19 illustrates a document recognition system useable with the present invention. FIGS. 20 and 21 are flowcharts illustrating procedures for operating the FIG. 19 system according to the present invention. In order to input a bitmap image (S100), a paper document is scanned using an image scanner 100 to produce a bitmap document image 110. It is understood that the scanning process can be performed essentially at the same time that the recognition processes are performed, or the bitmap document image 110 can be supplied on some type of electronic storage medium such as a hard or floppy disk. The bitmap document image 10 is supplied to a conventional segmenter 150 (S110) which segments the bitmap image into smaller subimages, such as, for example textual subimages containing only text, and graphics subimages containing only graphics. The segmenter 150 can iteratively segment the bitmap image into smaller subimages until each subimage is recognized as containing only text or only graphics. The graphics subimages are then supplied to a structure image recognizer (or graphics recognizer) 200, while the textual subimages are supplied to a character recognizer 300. Of course, if it is known in advance that the bitmap document image contains only text or graphics, it can be supplied directly to the structure image recognizer 200 or character recognizer 300.

The structure image recognizer 200 then transforms the bitmap graphics image (or subimages) into coded graphics data (S160) which can be recorded in graphics-elements, such as the graphics-elements described above, using a document description language. That is, unrecognized bitmap images are placed in unresolved-graphics-image-type elements (S170): image-elements if they are large, or spot-elements and represented as hexadecimal values if they are small. If the graphics image or subimages are recognized and transformed into coded graphics data, they are placed in one or more segment-elements and/or arc-elements (S180). Additional information regarding uncertainty (for example, possible offsets of the parameters (coded data) describing the graphics structures optionally can be recorded in these elements (S185).

Thus, when transforming graphics bitmap images into editable coded data using the present invention, the graphics structure image recognizer 200 acts as a first transformation means for performing a first transformation operation on the bitmap graphics image to transform the graphics bitmap image into one or more graphics elements containing coded data defining graphics structures; and as a first identification means using the document description language for identifying the one or more graphics elements transformed by the first transformation means, each graphics-element including an element type identifier indicating a type of coded data regarding the recognized bitmap image contained in that element. When the first transformation means determines that the coded data contained in the graphics-element has not been transformed with a predetermined level of confidence, the identification means also includes in the graphics-element uncertainty information (offsets) determined by the first transformation means regarding the coded data contained in each graphics element.

The character recognizer 300 transforms the bitmap textual image (or subimages) into coded character data (S120) which is then stored in the appropriate element in S140 or S150 (character-string or questionable-character) as described above. In order to determine whether to place coded character data in a character-string-element or a questionable-character-element, a determination is made in S130 as to whether a recognized character was recognized with at least a predetermined level of confidence. Although the insertion of a character into a questionable-character-element serves to convey uncertainty information about that character, additional information such as alternate possible uncertain characters, or degrees of certainty for uncertain characters can also be included in a questionable-character-element (S155). Thus, the character recognizer 300 will produce a stream of character-string-elements and questionable-character-elements, which can then be supplied to a word recognizer 400.

The word recognizer 400 includes a dictionary or lexicon of words therein. The word recognizer 400 operating according to the present invention, would then perform the procedure illustrated in FIG. 20 for each questionable-character-element. First, in S200, a plurality of characters are sequentially substituted for the questionable-character-element in the word containing the questionable-character-element. In S210, a determination is made as to whether any of the words formed by the substituting step (S200) were found in the lexicon of the word recognizer 400. Such words are referred to as "verified words". If no verified words are found, the questionable-character-element is returned in S240, and optionally, in S245, the uncertainty information contained in the questionable-character-element is updated based upon any determinations made by the word recognizer 400. If the determination in S210 is positive, each verified word is placed in a verified-word-element (S220). Next, in S230, if more than one verified-word-elements are produced from a single questionable-character-element, the multiple verified-word-elements are placed in an alternate-word-element.

Each alternate-word-element can be transformed into a character-string-element by a semantics analyzer 500 which attempts to determine which of the verified words in an alternate-word-element is correct based upon surrounding words. If the semantics analyzer cannot determine which of the verified words in an alternate-word-element are correct, it returns the alternate-word-element, and optionally provides uncertainty information for each of the verified words in each verified-word-element therein.

Thus, when transforming textual bitmap images into editable coded data using the present invention, the character recognizer 300 acts as a first transformation means for performing a first transformation operation on the textual bitmap image to transform the textual bitmap image into one or more elements containing coded character data; and as a first identification means using the document description language for identifying the one or more elements transformed by the first transformation means, each element including an element type identifier indicating a type of coded character data regarding the recognized bitmap textual image contained in the element. Elements containing characters not recognized with a predetermined level of confidence are recorded in elements identified by the first identification means as questionable-character-elements, while certain characters are recorded in elements identified as character-string-elements.

The word recognizer 400 acts as a second transformation means for transforming each questionable-character-element and adjacent confidently recognized characters in a same word as the questionable-character-element into one or more verified words by substituting alternate characters for the questionable-character-element and verifying that a word resulting from the substitution exists in a lexicon; and as a second identification means using the document description language for placing each verified word in a verified-word-element. When more than one verified-word-elements are created for a questionable-character-element, the second identification means also places the more than one verified-word-elements in an alternate-word-element. The second identification means maintains the questionable-character-element when no verified words are determined to exist.

The alternate-word-element can then be supplied to semantics analyzer 500 which acts as a means for determining which verified word within an alternate-word-element is a correct verified word based on words surrounding the alternate-word-element; and as a third identification means for identifying the correct verified word, and for replacing the alternate-word-element with a character-string-element containing the correct verified word.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of transforming a document represented as a bitmap image into an editable coded data stream defined using a machine readable document description language that records coded information resulting from the document transformation process and information regarding uncertainties in the document transformation process, comprising:

performing a first transformation operation on at least a text portion of said bitmap image using a character recognition apparatus, to transform at least said text portion of said bitmap image into coded information recognized with a level of confidence;

outputting and recording said coded information into one or more elements that are defined using said document description language, each element having a machine readable element type identifier that indicates the type of said coded information regarding the recognized bitmap image recorded in said element so that the type of coded information contained in each element can be known without examining the coded information contained in each element, the element type identifier for each element having been defined based on the type of coded information recorded in the element and the level of confidence with which said bitmap image represented by said coded information was recognized so that each of said elements is selectively identified, each element having coded information of a single type recorded therein; and when said character recognition apparatus determines that the recognized bitmap image contained in an element has not been recognized with at least a predetermined level of confidence, recording in said element uncertainty information determined by said first recognition apparatus regarding said recognized bitmap image contained in said element;

wherein said element type identifier is a character-string-element or a questionable-character-element, each character-string-element containing a string of consecutive characters recognized by said character recognition apparatus with at least said predetermined level of confidence, each questionable-character-element containing said uncertainty information determined by said character recognition apparatus for a character which was not recognized with at least said predetermined level of confidence by said character recognition apparatus.

2. The method of claim 1, wherein said uncertainty information includes a degree of uncertainty with which said character recognition apparatus transformed said bitmap image.

3. The method of claim 1, further comprising:

for each questionable-character-element, using a word recognizer to transform said questionable-character-element and adjacent confidently recognized characters in a same word as said questionable-character-element into one or more elements having an element type identifier defined as a verified-word-element, by substituting alternate characters for said questionable-character-element when one or more words created by said substituting are recognized by said word recognition apparatus; when more than one verified-word-element is transformed for each questionable-character-element, said more than one verified-word-elements being placed in an element having an element type identifier defined as an alternate-word-element; said question-able-character-element remaining when no verified words are recognized by said word recognition apparatus.

4. The method of claim 3, further comprising:

for each alternate-word-element, using a semantics analyzer to transform verified words of the verified-word-elements contained in each alternate word element into an element identified as a character-string-element corresponding to one of the verified words contained in said alternate-word-element when said semantics analyzer determines that said one of said verified words is a correct word, said alternate-word-element remaining when none of said verified words is determined to be a correct word by said semantics analyzer.

5. The method of claim 4 wherein for each verified-word-element contained in each alternate word element, said semantics analyzer determines and identifies a confidence level of each verified word contained in each verified-word-element, and indicates the confidence level of each verified-word-element when none of the verified words in an alternate-word-element are determined to be a correct word by said semantics analyzer.

6. The method of claim 1, wherein for each questionable-character-element, said uncertainty information pertaining to a character not recognized with at least said predetermined level of confidence includes a most likely uncertain character identified by said character recognition apparatus.

7. The method of claim 6, wherein for each questionable-character-element, said uncertainty information pertaining to a character not recognized with at least said predetermined level of confidence also includes a degree of confidence determined by said character recognition apparatus for said most likely uncertain character.

8. The method of claim 1, wherein for each questionable-character-element, said uncertainty information pertaining to a character not recognized with at least said predetermined level of confidence includes alternate possible uncertain characters identified by said character recognition apparatus.

9. The method of claim 8, wherein for each questionable-character-element, said uncertainty information pertaining to a character not recognized with at least said predetermined level of confidence also includes a degree of confidence determined by said character recognition apparatus for each said alternate possible uncertain character.

10. A method of transforming a document represented as a bitmap image into an editable coded data stream defined using a machine readable document description language that records coded information resulting from the document transformation process and information regarding uncertainties in the document transformation process, comprising the steps of:

a) analyzing text portions of said bitmap image using a character recognizer to transform said text portions of said bitmap image into said coded information recognized with a level of confidence;

b) outputting and recording said coded information into a series of elements that are defined using said document description language, each element having a machine readable element type identifier that indicates the type of said coded information regarding the recognized bitmap image recorded in said element so that the type of coded information contained in each element can be known without examining the coded information contained in each element;

c) the element type identifier for each element having been defined using said document description language based on the type of coded information recorded in the elements by defining the type identifier of each of said elements as character-string-elements or questionable-character-elements, each element defined as a character-string-element containing a string of consecutive characters recognized by said character recognizer with at least a predetermined level of confidence, each element defined as a questionable-character-element containing information pertaining to a character not recognized with at least said predetermined level of confidence, said character-string-elements and said questionable-character-elements being arranged as a continuous stream of elements based on an order of the characters in said bitmap image, each element having coded information of a single type recorded therein;

d) for each element defined as a questionable-character-element, analyzing the coded information pertaining to the character contained therein and adjacent confidently recognized characters contained in a same word as said questionable-character-element using a word recognizer, to transform and record said coded information and adjacent confidently recognized characters into one or more elements having type identifiers defined as verified-word-elements by substituting alternate characters for said questionable-character-element and determining whether one or more verified words created by said substituting are recognized by said word recognizer; and e) when more than one verified-word-elements are transformed for each questionable-character-element, placing said more than one elements defined as verified-word-elements in an element having an element type identifier defined as an alternate-word-element, said questionable-character-element remaining when no verified words are recognized by said word recognizer.

11. The method of claim 10, further comprising:

f) for each alternate-word-element, analyzing the verified words of the verified-word-elements contained therein and surrounding words using a semantics analyzer, to transform said alternate-word-element into an element identified as a character-string-element corresponding to one of verified words contained in said alternate-word-element when said semantics analyzer determines that one of said verified words is a correct word, said alternate-word-element remaining when none of said verified words is determined to be a correct word by said semantics analyzer.

12. The method of claim 11, wherein for each verified-word-element contained in each alternate-word-element, said semantics analyzer determines and identifies a confidence level of each verified word contained in each verified-word-element, and indicates the confidence level for each verified-word-element when none of the verified words in an alternate-word-element are determined to be a correct word by said semantics analyzer.

13. The method of claim 10, wherein for each questionable character element, said information pertaining to a character not recognized with at least said predetermined level of confidence includes a most likely uncertain character identified by said character recognizer.

14. The method of claim 13, wherein for each questionable-character-element, said information pertaining to a character not recognized with at least said predetermined level of confidence also includes a degree of confidence determined by said character recognizer for said most likely uncertain character.

15. The method of claim 10, wherein for each questionable-character-element, said information pertaining to a character not recognized with at least said predetermined level of confidence includes alternate possible uncertain characters identified by said character recognizer.

16. The method of claim 15, wherein for each questionable-character-element, said information pertaining to a character not recognized with at least said predetermined level of confidence also includes a degree of confidence determined by said character recognizer for each said alternate possible uncertain character.

17. An automatic document recognition apparatus for transforming text documents represented as bitmap image data into an editable coded data stream defined using a machine readable document description language that records coded data resulting from the document transformation process and information regarding uncertainties in the document transformation process, said apparatus comprising:
 a character recognizer having:
  a) first transformation means for performing a character recognition operation on said bitmap image representation of said document to transform said document into coded character data recognized with a level of confidence; and
  b) first identification means for outputting and recording said coded character data into one or more elements that are defined using said document description language, said first identification means further defining a machine readable element type identifier for each element, said element type identifier indicating the type of said coded character data regarding the recognized bitmap image recorded in said element so that the type of coded character data contained in each element can be known without examining the coded character data contained in each element, said identification means selectively identifying said one or more elements by defining the element type identifier for each element based on the type of coded data recorded in the element and the level of confidence with which said bitmap image was recognized, each element having coded character data of a single type recorded therein, and, when said first transformation means determines that the coded character data contained in the element has not been transformed with a predetermined level of confidence, said identification means also recording in said element uncertainty information determined by said first transformation means regarding said coded character data contained in said element; wherein said element type identifier is a character-string-element or a questionable-character-element, each character-string-element containing a string of consecutive characters recognized by said character recognition apparatus with at least said predetermined level of confidence, each questionable-character-element containing said uncertainty information determined by said character recognition apparatus for a character which was not recognized with at least said predetermined level of confidence by..said character recognition apparatus.

18. The apparatus of claim 17, wherein said uncertainty information includes a confidence level with which said first transformation means determined said coded data.

19. The apparatus of claim 17, further comprising:
 a word recognizer having:
  i) second transformation means for transforming each questionable-character-element and adjacent confidently recognized characters in a same word as the question-able-character-element into one or more verified words by substituting alternate characters for the questionable-character-element and verifying that a word resulting from said substituting exists in a lexicon; and
  ii) second identification means using said document description language for placing each verified word in an element having an element type identifier defined as a verified-word-element, and when more than one verified-word-elements are created for a questionable-character-element, placing said more than one verified-word-elements in an element having an element type identifier defined as an alternate-word-element, said questionable-character-element remaining when no verified words are determined to exist.

20. The apparatus of claim 19, further comprising:
 a semantics analyzer including:
  1) means for determining which verified word within an alternate-word-element is a correct verified word based on words surrounding the alternate-word-element; and
  2) third identification means for identifying said correct verified word and for replacing said alternate-word-element with an element identified as a character-string-element containing said correct verified word.

* * * * *